(12) United States Patent
Hulan

(10) Patent No.: US 7,102,764 B1
(45) Date of Patent: Sep. 5, 2006

(54) DIGITAL COPYING MACHINE INCLUDING PHOTO FEATURES FUNCTION

(75) Inventor: Gregory T. Hulan, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/442,676

(22) Filed: Nov. 18, 1999

(51) Int. Cl.
*G06F 15/00* (2006.01)
*G06K 15/02* (2006.01)

(52) U.S. Cl. .................. 358/1.12; 358/1.2; 399/86; 399/45

(58) Field of Classification Search .......... 358/1.1–1.9, 358/1.11–1.18, 505, 506, 401, 449, 450, 451, 358/474, 487, 488, 497, 296, 302; 355/39, 355/46, 38, 54, 55, 56, 81, 82, 84; 396/551, 396/562, 568; 399/7, 43, 80, 81, 86, 131, 399/139, 145, 151, 160, 190, 196, 209, 211, 399/300, 362, 363, 365, 370, 371, 376, 378, 399/381, 382, 383, 386–391
See application file for complete search history.

(56) References Cited

U.S. PATENT DOCUMENTS

| | | | |
|---|---|---|---|
| 4,847,662 A * | 7/1989 | Yamada | 355/55 |
| 4,862,200 A * | 8/1989 | Hicks | 396/311 |
| 4,893,194 A | 1/1990 | Sakata | 358/443 |
| 5,099,336 A | 3/1992 | Moriya | 358/300 |
| 5,109,281 A | 4/1992 | Kobori et al. | 358/296 |
| 5,144,452 A | 9/1992 | Abuyama | 358/296 |
| 5,191,429 A | 3/1993 | Rourke | 358/296 |
| 5,610,728 A | 3/1997 | Sobue | 358/449 |
| 5,623,581 A | 4/1997 | Attenberg | 358/1.6 |
| 5,867,279 A | 2/1999 | Funamizu et al. | 358/296 |
| 5,889,578 A * | 3/1999 | Jamzadeh | 355/41 |
| 5,913,019 A | 6/1999 | Attenberg | 358/1.18 |
| 6,183,933 B1 * | 2/2001 | Ishikawa et al. | 430/256 |
| 6,236,473 B1 * | 5/2001 | Collard | 358/488 |

FOREIGN PATENT DOCUMENTS

| | | | |
|---|---|---|---|
| EP | 0577924 A1 | 1/1994 | |
| EP | 0889637 A2 | 1/1999 | |

* cited by examiner

Primary Examiner—King Y. Poon

(57) ABSTRACT

A digital copying machine includes a function that allows a standard photo size to be selected, an original photo to be scanned and multiple copies of the photo to be printed on a sheet. The digital copying machine automatically scales the copies to the selected size and rotates the copies to use maximum printable area.

6 Claims, 4 Drawing Sheets

DIGITAL COPYING MACHINE INCLUDING PHOTO FEATURES FUNCTION

BACKGROUND OF THE INVENTION

The invention relates to digital copiers. More specifically, the invention relates to the digital copying of photographs.

"All-in-One" and multifunction machines combine the capabilities of printers, scanners and copiers into a single compact package. By replacing a standalone printer, a standalone scanner and a standalone copier, a single All-in-One machine can free up desk space and reduce the number of computer cables. These features make the All-in-One machines ideal for home businesses.

All-in-One machines such as the "HP OfficeJet R Series" from Hewlett-Packard Company include inkjet print modules that are capable of photo-quality color printing. An R-80 All-in-One machine, for instance, can scan a photograph and print the scanned photo on photo-quality paper. Quality of the copy matches that of the original. Using a zoom function, the copy can be made larger or smaller than the original. Using a clone function, multiple copies of the original can be printed onto a single sheet of paper.

These features make the All-in-One machine ideal for home use too. Photographs can be scanned, printed out and distributed immediately instead of traveling to a photo shop and waiting for copies to be made. Pictures of newborns and toddlers can be conveniently and immediately distributed to friends and relatives. Use of the clone function can save paper, especially for wallet-sized copies.

It is usually desirable to distribute copies that have standard sizes, such as wallet size and 5"×7" size. A photograph having a non-standard size can be difficult to place in a wallet or standard size frame.

However, using All-in-One machines to make standard size copies can be cumbersome. For example, if a person has a 3"×5" original of his or her newborn infant and wants wallet size copies, the person selects a "Clone 100%" function and calculates the zoom percentage that is needed to create the desired copy size. In this case, a zoom percentage of 70% is calculated (this all requires measurements of the original to be taken, an understanding of math and the use of a calculator). The person reduces the clone size to 70% and presses a "copy" button. The machine pre-scans the original and calculates the actual size of the original. The machine then calculates the number of copies that can fit on a single sheet, performs a full scan of the original and prints the copies.

If that person also wants copies of a different size (e.g., a 5"×7" copy), a new zoom percentage is calculated, the clone function is selected again, the clone size is changed to the new zoom percentage, and the copy button is pressed again. If two copies of a standard size such as 5"×7" are desired, the copy button is pressed yet another time (since only one 5"×7" copy will appear on each sheet).

SUMMARY OF THE INVENTION

Making copies of standard sizes is made much easier by the present invention. According to one aspect of the present invention, an apparatus includes a scan module; a print module; an input device for allowing a standard photo size to be selected; and a controller for causing the scan module to scan an image. The controller automatically determines actual size of the scanned image, scales copies of the scanned image to the selected size, and causes the print module to print the copies on a single sheet.

Other aspects and advantages of the present invention will become apparent from the following detailed description, taken in conjunction with the accompanying drawings, illustrating by way of example the principles of the present invention.

DETAILED DESCRIPTION OF THE INVENTION

Figure 1:
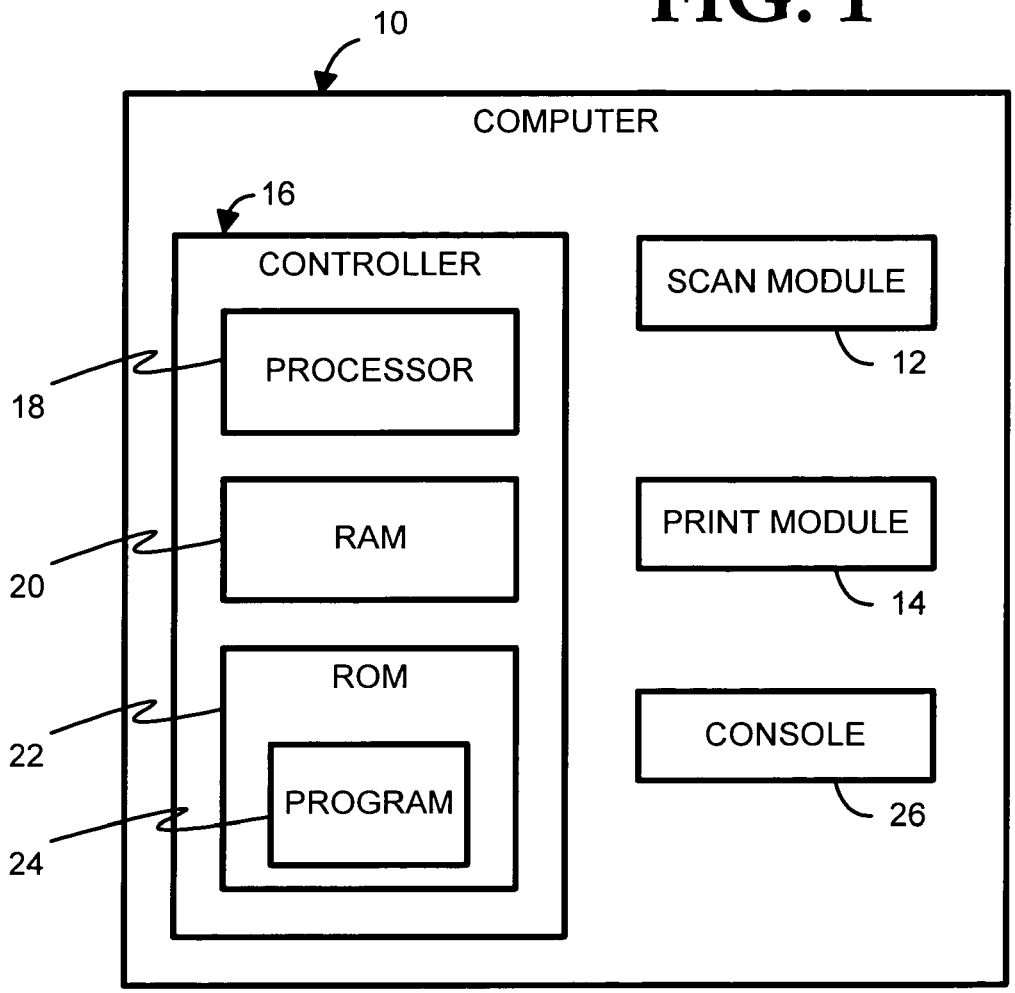
FIG. 1 is an illustration of a digital copying machine.

As shown in the drawings for purposes of illustration, the present invention is embodied in a digital copying machine including a scan module and a photo-quality color print module. The digital copying machine may be a dedicated digital copier, an All-in-One machine, etc. The digital copying machine displays a menu of different photo sizes. After a photo size is selected, the digital copying machine automatically scans a photograph, automatically scales the copies of the image to the selected size, rotates the copies, if necessary, to utilize a maximum printable area, and prints the copies on a single sheet. Such copying of photos is far more convenient than selecting a Clone function, calculating a zoom percentage, reducing clone size to the zoom percentage, and pressing a "copy" button. No manual calculations are needed.

FIG. 1 shows a digital copying machine 10 including a scan module 12 and an inkjet print module 14. The scan module 12 is capable of color scanning of photographs. For example, the scan module 12 may have a 600×2400 dot per inch ("dpi") optical resolution in 30-bit color and 8-bit grayscale. The print module 14 is capable of photo-quality color printing. For example, the print module 14 may perform 600×600 dpi printing using three printable colors and "PhotoREt II" color layering technology, which mixes color dots to create millions of solid colors. The print module 14 may be able to print on photo quality paper such as an 8.5"×11" high gloss photo paper.

The digital copying machine 10 also includes a controller 16, which may have a processor 18, random access memory ("RAM") 20 and read-only memory ("ROM") 22. Stored in the ROM 22 is a program 24 that is executable by the processor 18. When executed, the program 24 instructs the processor 18 to control the scan and print modules 12 and 14.

Figure 2:
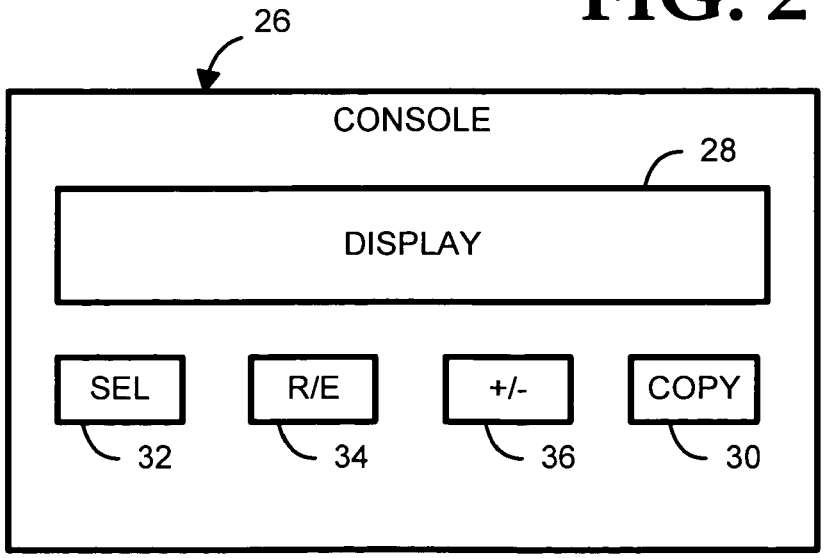
FIG. 2 is an illustration of a console of the digital copying machine.

Referring additionally, to FIG. 2, the digital copying machine further includes a console 26, which provides user I/O functions. User output is directed to an LCD 28 of the console 26, and user input is provided by a plurality of buttons. The buttons include a "Copy" button 30 a "Select" button 32, a "Reduce/Enlarge" button 34 and a "+/−" button 36. User I/O functions may be processed by a combination of the processor 18 and the ROM 22.

The ROM 22 also stores a list of different types of machine functions. Repeatedly pressing the Reduce/Enlarge button causes the controller 16 to display different types of functions on the LCD 28. One of the functions is a "Photo Features" function (some of the other functions may include "Auto Fit," "Clone," "2 on 1" and "Legal ->Letter"). The Photo Features function may be selected by displaying the Photo Features function and pressing the Select button 32.

The ROM 22 also stores a list of entries for the Photo Features function. When the Photo Features function is entered, the controller 16 displays a first entry on the LCD 28. Pressing the +/− button 38 causes the controller 16 to display other entries. Some of the entries may include:

Original ->9 wallets
Original ->4 3"×5"
Original ->2 5"×7"
Original ->1 8"×10"
Photo Package An entry may be selected by pressing the +/− button 34 until that entry is displayed and then pressing the Select button 32. Placing an original on a glass pane of the scan module 12, selecting the Original ->9 wallets entry and pressing the Copy button 30 causes the digital copying machine 10 to scan the original and print out a single 8.5"×11" sheet having 9 wallet size copies. Selecting the Original ->4 3"×5" entry and pressing the Copy button 30 causes four 3"×5" copies to be printed out on a single 8.5"×11" sheet. Selecting the Original ->2 5"×7" entry and pressing the Copy button 30 causes two 5"×7" copies to be printed out on a single 8.5"×11" sheet. Selecting the Original ->1 8"×10" entry and pressing the Copy button 30 causes a single 8"×10" copy to be printed out on a single 8.5"×11" sheet. Selecting the Photo Package entry and pressing the Copy button 30 causes the digital copying machine 10 to print out nine wallet size copies on a first sheet of paper, four 3"×5" copies on a second sheet of paper, two 5"×7" copies on a third sheet of paper, and a single 8"×10" copy on a fourth sheet of paper.

Figure 3:
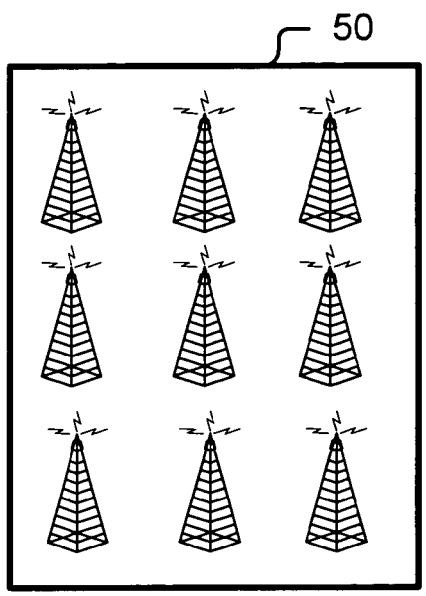
FIG. 3 is an illustration of a Photo Package.
Figure 3:
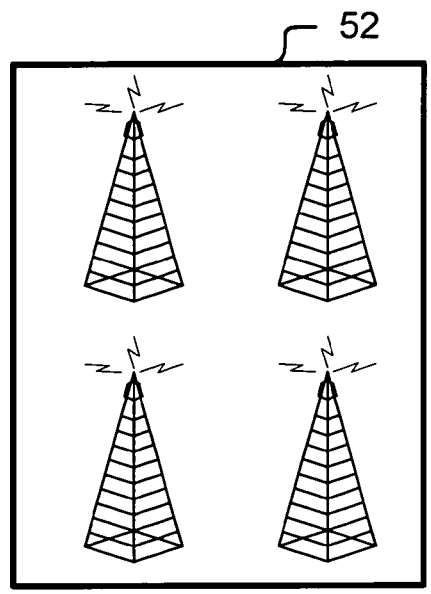
Figure 3:
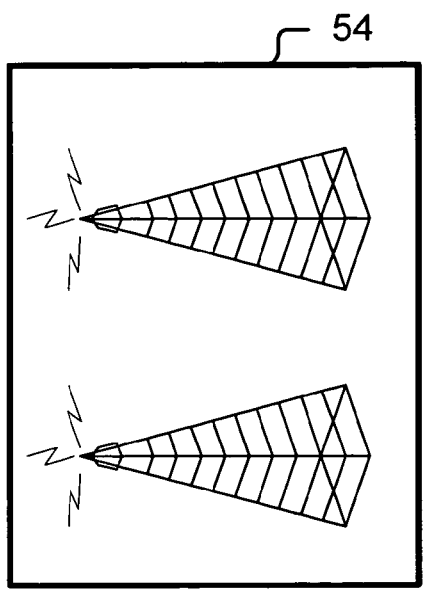
Figure 3:
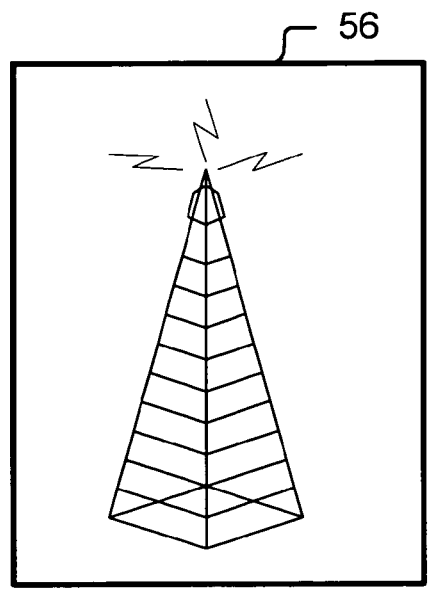

The first, second, third and fourth sheets 50, 52, 54 and 56 of the Photo Package are illustrated in FIG. 3. The copies of the third sheet 54 are rotated so that two 5"×7" copies fit on a single 8.5"×11" sheet.

Figure 4:
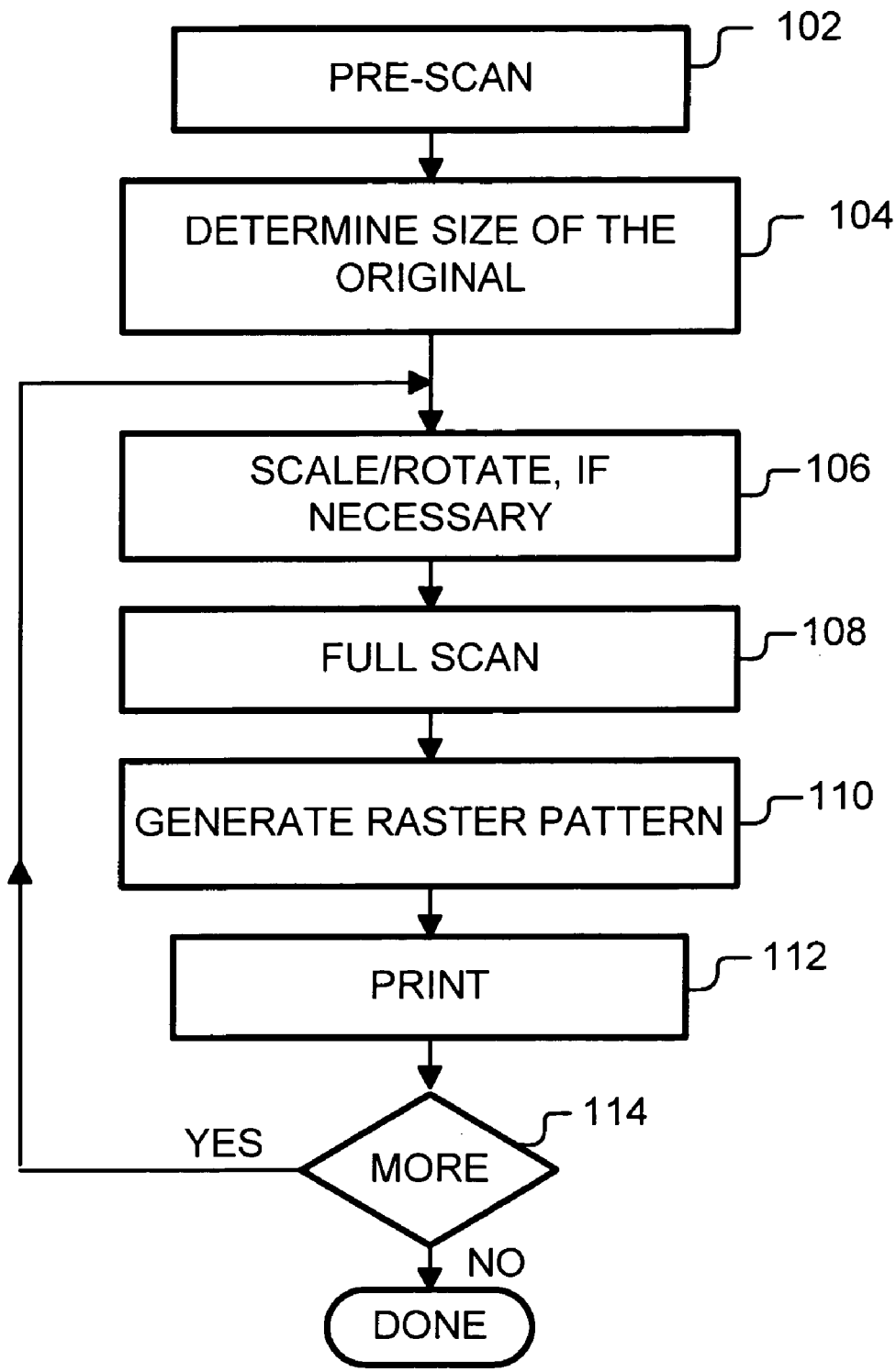
FIG. 4 is an illustration of a method of scanning an original and printing copies of the scanned original.

FIG. 4 describes the operation of the digital copying machine 10 when the Photo Features entry is selected and the Copy button 30 is pressed. The controller 16 commands the scan module 12 to pre-scan the original (block 102) and uses the output of the scan module 12 to determine the length and width of the original (block 104).

The controller 16 also determines whether the copies should be scaled/rotated in order to utilize maximum print area (block 106). Scaling is proportional. Thus, reducing the length by 5% would result in the width being reduced by the same 5%. A 4"×5" original would be scaled by a zoom factor of 125% to fit into a 5"×7" size. Depending upon the orientation of the original on the glass pane, the controller 16 might also rotate the two copies in order to fit on a single 8.5"×11" sheet. If the 4"×5" original was placed in the same orientation on the glass as in print, the copies would be rotated by 90 degrees. In any event, there is no need for the user to rotate the original on the glass pane of the scan module 12.

The controller 16 then performs a full scan of the original (block 108), generates a raster pattern of the copies (block 110) and sends the raster pattern to the print module 14. The print module 14 prints out the raster pattern onto a sheet of photo quality paper (block 112).

If the Photo Package entry is selected, the steps at block 106 to 112 are repeated for each additional sheet (block 114). If, for example, the Photo Package includes two sheets of wallet size photos instead of one, the controller 16 would command the print module 14 to print out two sheets of wallet size copies instead of one. If, for example, the Photo Package includes different sized photos the controller causes the scan module to print copies of a different photo size on an additional sheet when the Photo Package entry is selected.

Thus disclosed is a digital copying machine that takes only a few simple console entries to scan a photograph and automatically print one or more sets of standard size copies. Maximum printable area is used. Use of a photo quality color printer and photo quality paper allows photo quality copies to be reproduced. Reproducing copies via the Photo Features function is far more convenient than selecting the Clone function, calculating a zoom percentage, reducing clone size to the zoom percentage, and pressing a "copy" button. No manual calculations are needed.

Figure 5:
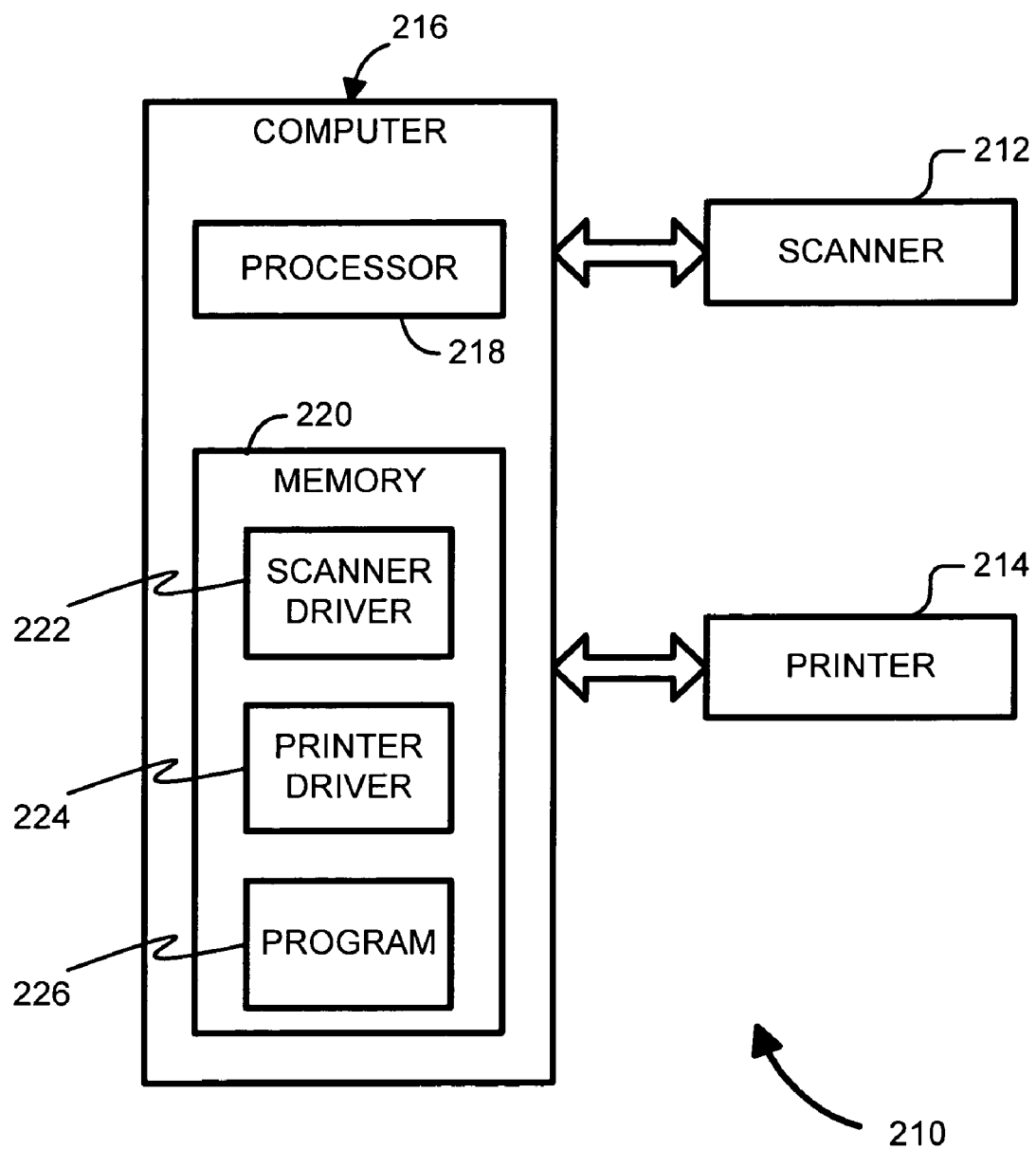
FIG. 5 is an illustration of an alternative digital copying system.

The invention is not limited to a digital copying machine. The invention may be applied to any machine or combination of machines that include a print module, a scan module and an input device for selecting copy sizes. For example, the invention may be applied to a combination 210 of a standalone scanner 212, a standalone printer 214 and a personal computer 216, as shown in FIG. 5. The computer 216 includes a microprocessor 218 and memory 220. Stored in the memory 220 are scan and print drivers 222 and 224 for commanding the scanner 212 and printer 214 to perform basic scan and print functions. Also stored in the memory 220 is a program 226 for causing the computer 216 to display a virtual console. The virtual console may include the same display and buttons as the console 26 shown in FIG. 2.

After an original is placed on the scanner 212, the computer 216 is used to select the Photo Features function, select an entry and start the copying. The computer 216 commands the scanner 212 to perform a pre-scan of the original, determines whether the copies should be scaled/rotated, commands the scanner 212 to perform a full scan of the original, and commands the printer 214 to print the copies on one or more sheets.

The invention is not limited to the console shown in FIG. 2. The Photo Features function and different entries may be selected in any number of ways.

The invention is not limited to the types of entries and standard sizes described above. Other types of entries and standard sizes may be offered. For example, a digital copying machine intended for the European market would use standard photo sizes and sheet sizes that are based on the Metric system.

The controller may be programmed to offer entries for countries other than, or in addition to, the United States. The selection of the country may be made from the console. Thus, if a European country is selected, the copies may be scaled to a Metric size, rotated and printed out on a sheet of A4 size paper.

The controller may include a processor/RAM/ROM, or it may include one or more ASICs, or it may include a combination thereof. The I/O functions may be handled by the controller or by a dedicated circuit.

Therefore, the invention is not limited to the specific embodiments described above. Instead, the invention is construed according to the claims that follow.

What is claimed is:

1. Apparatus for scanning an original image and printing copies of the original image on a sheet, the apparatus comprising:

a scan module;
a print module;

an input device for allowing at least a first photo size, a second photo size, and a Photo Package entry to be selected; and a controller for causing the scan module to scan the original image, the controller automatically determining actual size of the original image, generating first scanned image copies that are scaled to the first photo size and that are positioned to utilize maximum printable area on the sheet, and causing the print module to print the first copies on the sheet, and wherein the controller is configured to, when the Photo Package entry is selected, generate second scanned image copies that are scaled to the second photo size and cause the print module to print the second copies on an additional sheet.

2. The apparatus of claim 1, wherein the apparatus is an All-in-One machine.

3. The apparatus of claim 1, wherein the input device prompts for additional standard sizes.

4. An article of manufacture for an apparatus including a scan module, a print module, an input device, a display device, and a processor, the article comprising:

computer memory; and a program stored in the computer memory, the program, when executed, commanding the processor to display a Photo Features entry on the display device; the program commanding the processor to command the scan module to perform a pre-scan of an original Image when the Photo Features entry is selected via the input device;

the program further commanding the processor to automatically determine actual size of the original image after the pre-scan is performed; command the scan module to perform a full scan; generate first scaled copies of an output of the scan module after the full scan is performed, the first copies being scaled to a first size indicated by the selected entry;

the program further commanding the processor to rotate the copies if necessary to utilize maximum printable area on the sheet; and cause the print module to print the first copies on the sheet, wherein the program commands the processor to display a Photo Package entry on the display device, and wherein the controller generates second scaled copies of the output of the scan module, the second copies being scaled to a second size indicated by the selected entry and the controller causes the print module to print the second copies on an additional sheet when the Photo Package entry is selected via the input device.

5. Apparatus for scanning and printing copies of an original image, comprising:

a scan module operable to scan the original image;

a print module operable to print copies of the original image;

an input device operable to allow one or more photo sizes to be selected and to allow a Photo Package entry to be selected; and means for causing the scan module to scan the original image, the means automatically determining an actual size of the scanned image and scaling copies of the original image to a photo size selected via the input device, the means also causing the print module to print the copies on a sheet, wherein the means scales additional copies of the scanned image to an additional photo size selected via the input device and causes the additional copies to be printed on an additional sheet when the Photo Package entry is selected.

6. The apparatus of claim 5, wherein the means also rotates at least one copy to utilize maximum printable area on the sheet.

* * * * *

UNITED STATES PATENT AND TRADEMARK OFFICE
CERTIFICATE OF CORRECTION

PATENT NO. : 7,102,764 B1 Page 1 of 1
APPLICATION NO. : 09/442676
DATED : September 5, 2006
INVENTOR(S) : Gregory T. Hulan It is certified that error appears in the above-identified patent and that said Letters Patent is hereby corrected as shown below:

In column 5, line 28, in Claim 4, delete "Image" and insert -- image --, therefor.

Signed and Sealed this

Twentieth Day of January, 2009

JON W. DUDAS
*Director of the United States Patent and Trademark Office*